(12) United States Patent
Trevis (10) Patent No.: US 10,501,951 B2
(45) Date of Patent: Dec. 10, 2019

(54) SURFING WAVE GENERATION (71) Applicant: Surf Lakes Holdings Ltd, Warner, Queensland (AU)

(72) Inventor: Aaron James Trevis, Warner (AU)

(73) Assignee: Surf Lakes Holdings Ltd, Warner, Queensland (AU)

( * ) Notice: Subject to any disclaimer, the term of this patent is extended or adjusted under 35 U.S.C. 154(b) by 0 days.

(21) Appl. No.: 16/109,901

(22) Filed: Aug. 23, 2018

(65) Prior Publication Data

US 2018/0363312 A1    Dec. 20, 2018

Related U.S. Application Data

(63) Continuation of application No. 15/315,504, filed as application No. PCT/AU2015/000344 on Jun. 9, 2015, now abandoned.

(30) Foreign Application Priority Data

Jun. 8, 2014  (AU) .................................. 2014902180

(51) Int. Cl.
*E04H 4/00* (2006.01)
*A63B 69/00* (2006.01)
*E02B 3/00* (2006.01)

(52) U.S. Cl.
CPC ........... *E04H 4/0006* (2013.01); *A63B 69/00* (2013.01); *A63B 69/0093* (2013.01); *E02B 3/00* (2013.01)

(58) Field of Classification Search
CPC combination set(s) only.
See application file for complete search history.

(56) References Cited

U.S. PATENT DOCUMENTS

| 3,477,233 | A | | 11/1969 | Andersen |
| 3,789,612 | A | † | 2/1974 | Richard |
| 3,973,405 | A | † | 8/1976 | Duport |
| 4,507,018 | A | | 3/1985 | Andersen |
| 6,928,670 | B2 | * | 8/2005 | Lochtefeld ............ E04H 4/0006 4/491 |
| 8,464,527 | B2 | | 6/2013 | Gerber et al. |
| 9,920,544 | B1 | † | 3/2018 | Bennett |
| 10,207,168 | B2 | † | 2/2019 | Bennett |

(Continued)

OTHER PUBLICATIONS

Mead, Shaw, Keynote Address: Surfing Science, Proceedings of the 3rd International Surfing Reef Symposium, Raglan, New Zealand, Jun. 22-25, 2003.

*Primary Examiner* — Sean D Andrish
(74) *Attorney, Agent, or Firm* — Hodgson Russ LLP (57) ABSTRACT

A wave generating apparatus (100) for generating at least one wave in a surface of a body of water (102) has at least one wave generating object (12, 150) with at least one wave generating surface (13, 152), drive means (108, 110) for causing the wave generating object to oscillate along a path (106), with the wave generating object in contact with the body of water for at least some of the time. When there is a single wave generating object (12, 150), the wave extends away from the wave generating object and when there are multiple wave generating objects (12, 150), the wave generating objects (12, 150) and wave generating surfaces (13, 152) are configured such that substantially all of any waves generated extend away from the wave generating objects.

7 Claims, 11 Drawing Sheets

(56) References Cited

U.S. PATENT DOCUMENTS

| | | |
|---|---|---|
| 2003/0223818 A1 | 12/2003 | Black |
| 2007/0036612 A1* | 2/2007 | Carnahan .................. E02B 3/04 |
| | | 405/21 |
| 2008/0060123 A1† | 3/2008 | Johnson |
| 2010/0088814 A1 | 4/2010 | Johnson |
| 2011/0289913 A1 | 12/2011 | Welch et al. |
| 2012/0020735 A1† | 1/2012 | Fricano |
| 2012/0077649 A1 | 3/2012 | McConnell |
| 2012/0255112 A1 | 10/2012 | Osterman et al. |
| 2014/0304905 A1† | 10/2014 | Bennett |
| 2015/0089731 A1† | 4/2015 | Lochtefeld |

\* cited by examiner
† cited by third party

SURFING WAVE GENERATION

FIELD OF INVENTION

This invention relates to wave pools and more particularly to the generation of artificial waves and creation of surfing wave breaks.

BACKGROUND

Artificial surfing wave facilities, typically called wave pools exist. Some are linear, in that they are generally rectangular and a wave travels from one end to the other. Other wave pools have a wave generating device located within the body of water, with waves radiating outwards toward the edges of the wave pool.

The present invention aims to provide novel apparatus for generation of waves and also novel structures for the generation of wave breaks.

SUMMARY OF THE INVENTION

In a first broad form the invention provides wave generating apparatus for generating at least one wave in a surface of a body of water, comprising at least one wave generating object, means for causing the wave generating object to oscillate vertically relative to the surface, with the wave generating object in contact with the body of water for at least some of the time,
wherein the at least one wave generating object has at least one wave generating surface and
wherein where there is a single wave generating object, the wave extends away from the wave generating object and
wherein where there are multiple wave generating objects, the wave generating objects and wave generating surfaces are configured such that substantially all of any waves generated extend away from the wave generating objects.

In another broad form the invention provides a method of generating at least one wave in a surface of a body of water, comprising providing at least one wave generating object, causing the wave generating object to oscillate vertically relative to the surface, with the wave generating object in contact with the body of water for at least some of the time, wherein the at least one wave generating object has at least one wave generating surface and
wherein where there is a single wave generating object, the wave extends away from the wave generating object and
wherein where there are multiple wave generating objects, the wave generating objects and wave generating surfaces are configured such that substantially all of any waves generated extend away from the wave generating objects.

In a preferred form a wave generating surface includes a surface angled to the direction of oscillation.

Oscillation may be along a linear path or may be by rotation about an axis. Oscillation along other path shapes is within the scope of the invention.

A wave generating object may be configured so that its oscillation causes waves to extend in substantially all directions. A wave generating object may be configured so that its oscillation causes waves to extend in one or more directions.

The wave generating surface may be a revolution of part of a straight line, a portion of a circle, ellipse, parabola or any other suitable shape.

The wave generating surface need not be symmetrical.

In one form the wave generating surface is convex and generates a wave that expands as it extends away from the wave generating surface. In another form the wave generating surface is concave and generates a wave that contracts as it extends away from the wave generating surface.

Where there are multiple wave generating surfaces, either on a single wave generating object or on multiple wave generating objects, the wave generating surfaces may be arranged to generate waves that expand, waves that contact or waves that do neither.

The system may include guides that constrain waves, such as from expanding.

The wave generating surface may be caused to oscillate whilst remaining substantially in the water or may be partially or totally out of the water.

The wave generating object may be buoyant.

The wave generating object may be repeatedly dropped or driven into the body of water and then withdrawn.

The wave generating object may be mounted on or constrained by one or more guide members. In one form a wave generating object may be have a passageway through which a guide member passes and the wave generating object is caused to oscillate along the guide member. In another form there may be one or more guide members located externally of the wave generating object that engage one or more external surfaces to guide the wave generating object.

The wave generating object is preferably caused to oscillate using a drive mechanism. The drive mechanism may drive the wave generating object toward the water or further into the water, with buoyancy causing movement in the opposite direction. Alternatively, the drive mechanism may move the wave generating object away from the water or out of the water with gravity being utilised to cause movement in the opposite direction. Alternatively, the drive mechanism may drive the wave generating object in both directions.

The drive mechanism may comprise a pneumatic or hydraulic ram. The ram may be double acting. Electromagnets may be used to drive the wave generating object in one or both directions. Other drive mechanisms are within the scope of the invention.

In another broad form the invention provides an artificial wave generating reef for causing a wave generated by at least one wave generator to break, the reef having a submerged break generating surface that extends underneath the water surface, a portion of the break generating surface nearer the at least one wave generator being further away from the water surface than a portion further away from the at least one wave generator.

Preferably the break generating surface extends at an angle to the travel of waves generated by the at least one wave generator, such that a wave breaks progressively along the length of the break generating surface.

The break generating surface may follow one or more linear or curved paths.

An artificial wave pool may have multiple artificial wave generating reefs located about one or more artificial wave sources. These may be arranged so that a wave breaks over one artificial wave generating reef and then breaks over another.

In another broad form the invention provides a reef module for an artificial wave generating reef, the reef module including a movable body that includes at least one break generating surface. The body is movable relative so as to adjust the height and or angle of the at least one break generating surface.

In one form the body is mounted for rotation about a first axis, whereby the at least one break generating surface is adjustable by rotation of the body about the first axis.

The first axis itself may be movable, such as rotatable about another axis, such as an axis perpendicular to the first axis. The height of the first axis may be adjustable.

Preferably, in use, the body is positioned above a base of a pool, such that water may flow between the body and the pool base.

In one form the reef module comprises at least one support leg and a body mounted for rotation on the at least one support leg. Optionally the at least one support leg is telescopic.

These and other features of the invention will be more apparent form the following non-limiting description of the following representations.

DETAILED DESCRIPTION OF PREFERRED AND OTHER EMBODIMENTS

Figure 1:
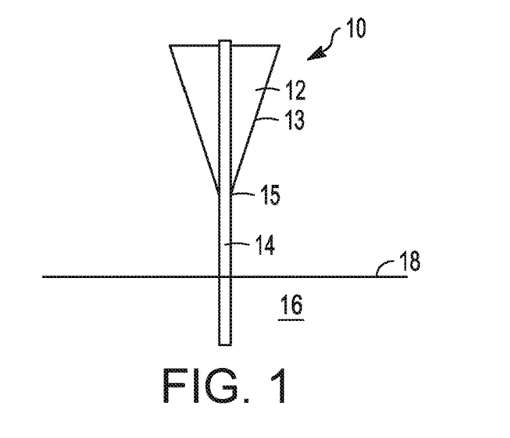
FIG. 1 is a side view of a wave generating arrangement according to a first implementation of the invention.
Figure 2:
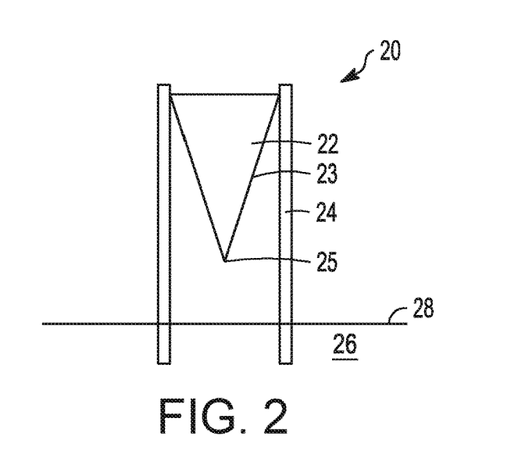
FIG. 2 is a side view of a wave generating arrangement according to a second implementation of the invention.
Figure 3:
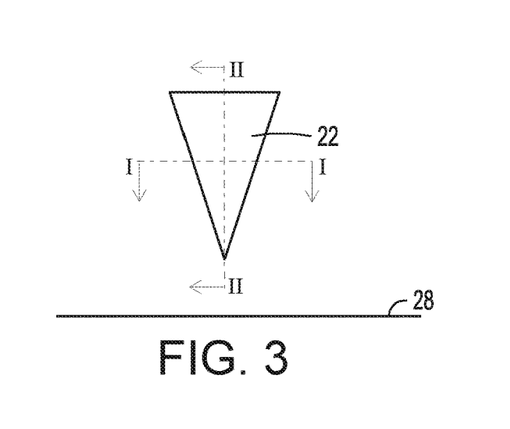
FIG. 3 is a schematic side view of a plunger used in the first implementation of the invention shown in FIG. 1 or in the second implementation of the invention shown in FIG. 2, wherein the plunger is depicted at a first position.
Figure 4:
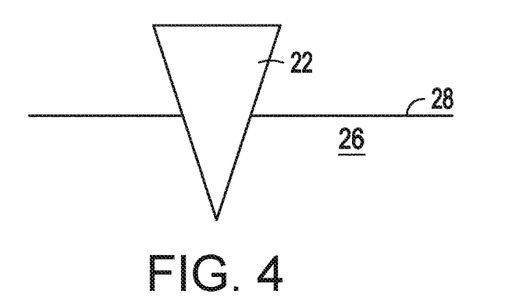
FIG. 4 is a side view of the plunger of FIG. 3 at an equilibrium position.

Referring to FIGS. 1 to 2 there are schematically shown two wave generation mechanisms 10 and 20.

In FIG. 1 the mechanism 10 comprises a plunger 12 mounted on a rod or shaft 14 for vertical motion, such that it may be caused to oscillate vertically in a body of water 16 having a water surface 18.

In FIG. 2 the mechanism 20 comprises a plunger 22 mounted on or guided by external guide members 24, such that it may be caused to oscillate vertically in a body of water 26 having a water surface 28.

The plungers 12 and 22 are substantially the same shape and have cone shaped portions 13 and 23 respectively that has a pointed lower ends 15 and 25 respectively.

The operation of the mechanisms is substantially the same and will be descried with reference the mechanism 20 and FIGS. 3 to 8. For clarity the guide and drive mechanism are not shown in these figures. In use the plunger may initially be raised above the water surface 28, as in FIG. 3 or may be initially at a neutral or resting position, as in FIG. 4, partially in the water 26.

The plunger 22 is preferably buoyant in water so the plunger will float, rather than sink.

Figure 5:
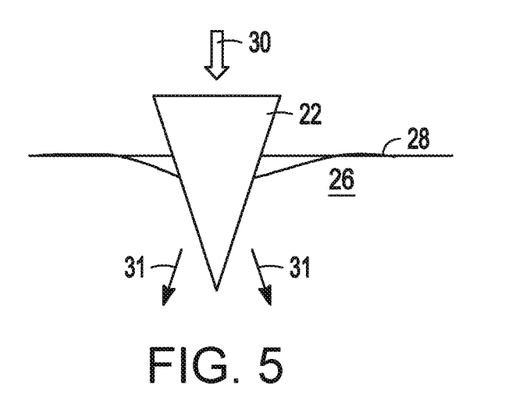
FIG. 5 is a side view of the plunger of FIG. 3 at a depressed position moving downwards.

A downward motion of the plunger 22 is generated, as indicated by arrow 30 in FIG. 5. This motion may be generated by dropping the plunger from above the water surface, as in FIG. 3 or by having a drive mechanism that applies force to the plunger 22, or a combination of both. The arrows 31 represent movement of water.

The plunger entering the body of water or being depressed from its equilibrium state displaces water sideways. The plunger reaches a maximum depth and then commences an upward motion, due to its buoyancy and/or a drive mechanism raising the plunger or both, as indicated by arrow 30 in FIG. 6. Depending on the drive mechanism, the downward travel may be limited by the drive mechanism or by the initial momentum of the plunger.

Figure 6:
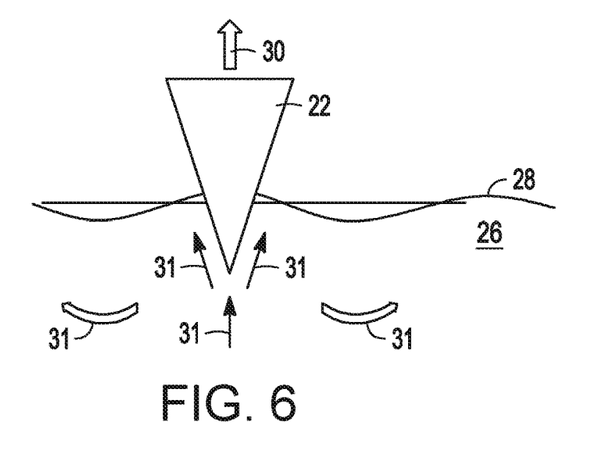
FIG. 6 is a side view of the plunger of FIG. 3 at an elevated position moving upwards.
Figure 7:
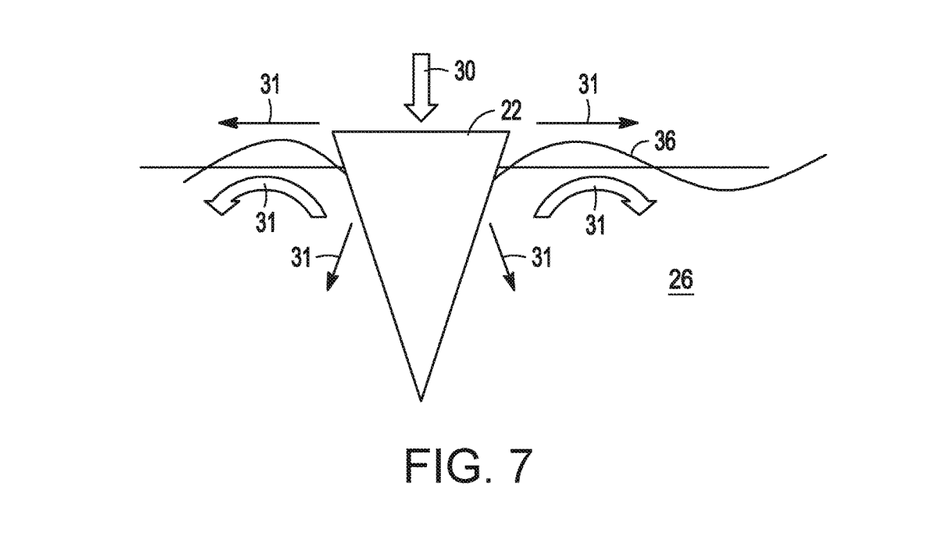
FIG. 7 is a side view of the plunger of FIG. 3 at a depressed position moving downwards again.
Figure 8:
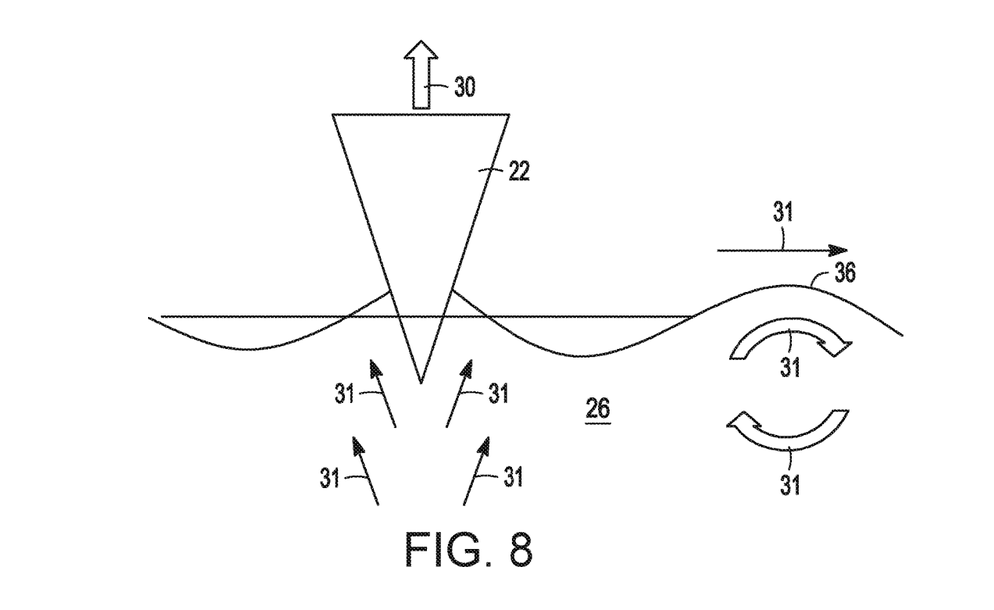
FIG. 8 is a side view of the plunger of FIG. 3 at an elevated position moving upwards again.
Figures 9A, 9B:
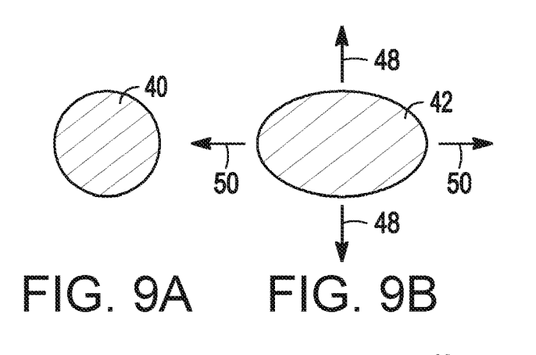
FIGS. 9A, 9B, 9C and 9D show a number of possible cross section views of alternates to the plunger of FIG. 3 taken though a horizontal plane indicated by section line I-I in FIG. 3.
Figure 9C:
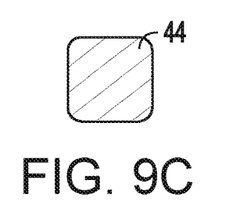
Figure 9D:
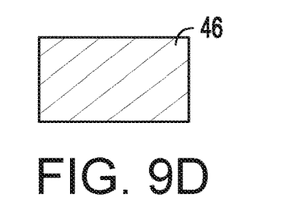
Figure 10A:
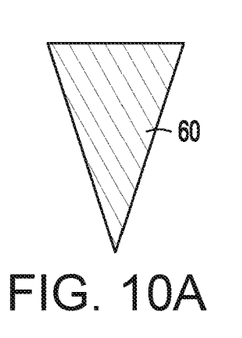
FIGS. 10A, 10B, 10C and 10D show a number of possible cross section views of alternates to the plunger of FIG. 3 taken though a vertical plane indicated by section line II-II in FIG. 3.
Figure 10B:
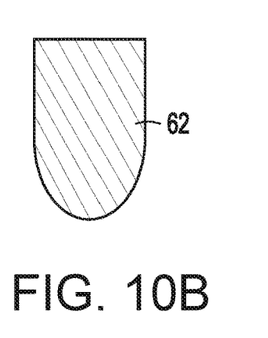
Figure 10C:
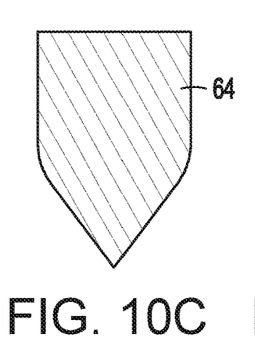
Figure 10D:
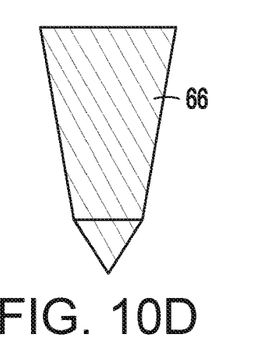
Figure 11A:
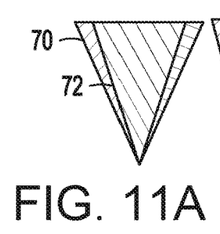
FIGS. 11A, 11B, 11C and 11D show a number of possible cross section views of alternates to plunger of FIG. 3 taken though a vertical plane indicated by section line II-II in FIG. 3.
Figure 11B:
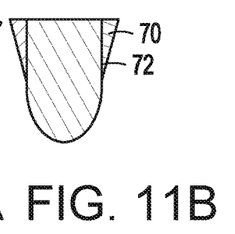
Figures 11C, 11D:
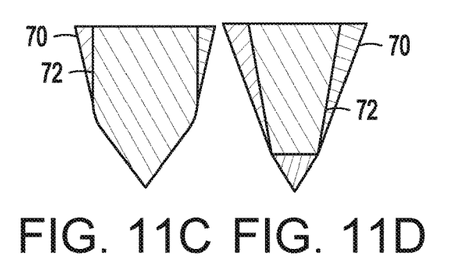

The upwards motion continues past the equilibrium point, as shown in FIG. 6 and the plunger is repeatedly pushed down by the drive mechanism, as shown by arrow 30 in FIG. 7 and repeatedly rebounds, as shown by arrow 30 in FIG. 8.

This repeated up and down motion generates waves 36 in the body of water 26. The volume of water in the radiating swell is replaced by water being "pumped" from below the plunger. This motion helps create a circular particle movement in the swell, much like an ocean swell.

The surface of the plunger 22 that displaces the water is substantially convex and so all waves radiate away from the plunger 22. This is in contrast to prior art mechanisms where not all waves radiate away and so cause interference and/or waste of energy. In contrast, loss of energy is minimised by the waves radiating away from the plunger.

FIGS. 9A through 9D show cross section profiles 40, 42, 44 and 46 applicable to the plungers 12 and 22. These are cross sections taken of plunger and do not represent a plan view. The actual cross section varies along the length of the plunger.

The plan cross section profile does not have to be circular as in 40 and may be oval (42), square (44), rectangular (46) or any other appropriate shape. Non-circular cross section profiles result in different wave patterns. For example, the oval profile 42 will tend to generate waves of a different strength in the direction indicated by arrows 48 compared to waves in the directions indicated by arrows 50.

The plungers 12 and 22 in side cross section have a triangular shape and again this may be varied. FIGS. 10A through 10D show side cross section profiles 60, 62, 64 and 66. These side cross section profiles may be combined with the plan view profiles in any combination.

The side cross section profile determines the "shape" of a wave generated by oscillation of the plunger. This is because the volume of the different plungers at the same depth is different and so the amount of water displaced varies.

FIGS. 11A through 11D show adjustable side cross section profiles. The plunger 22 may be provided with movable portions such that the profiles may be changed. Thus, for example, a plunger may have a large profile, as indicated by outline 70 when being depressed into the water and a small profile 72 when being raised.

Figure 12:
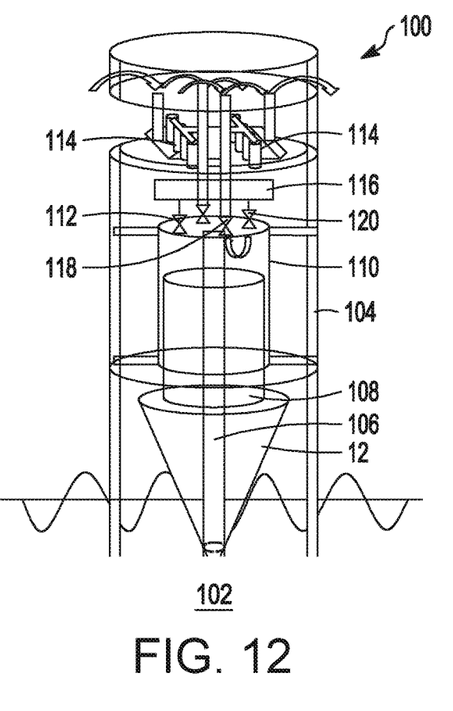
FIG. 12 shows a perspective view of a wave generating system according to an implementation of the invention.

FIG. 12 shows a drive and guide mechanism 100 for use with the plunger 12 shown in FIG. 1 to cause the plunger to oscillate in water body 102.

The drive and guide mechanism 100 includes supporting frame 104 and central guide post 106 on which is mounted plunger 12 and piston 108. Piston 108 is mounted within cylinder 110. Cylinder 110 receives compressed fluid, in this embodiment air, via one or more inlets 112 from pumps or compressors 114. An intermediate chamber 116 may be provided that acts as compressed air storage. Air is pumped by compressors 114 into storage chamber 116 and released into cylinder using valves 120. This allows compressors 114 to run continuously.

Introduction of pressurised air into cylinder 110 drives the plunger 12 into or lower in the water, generating waves.

Because the plunger 12 is not relying on gravity alone to generate downwards momentum it may be a hollow structure that is relatively buoyant. As such depression below an equilibrium point generates upwards forces on the plunger 12.

Cylinder 110 is provided with outlets 118 controlled by valves 120 that allow air in the cylinder to escape as the plunger rises. If desired pumps may be provided that apply suction to the outlets 118, so as to aid upwards motion on the plunger 12.

The plunger 12 is thus caused to oscillate up and down and generate waves. The amplitude of the waves may be determined by the driving pressure(s). The frequency of the waves can be varied by varying the driving frequency, although the system will tend to have natural frequency that will minimise driving power requirements.

Whilst the embodiment of FIG. 12 utilised air as the driving fluid, liquids may be used to drive the plunger 12 up and down.

Whilst the cylinder/piston arrangement shown in FIG. 12 is a single cylinder, it will be appreciated that a double acting cylinder may be utilised, in which movement in both direction is driven by pressurised fluid, whether a gas such as air or a liquid, such as hydraulic fluid or ordinary water.

The guide rod 106 is not essential and the plunger may be guided by external guides rather than a central rod. It will be appreciated that the plunger 12 in this embodiment is not limited to a simple cone shape and may be of any other profile, including those shown in the other figures.

It will be appreciated that the plunger 12 may be formed of multiple components and the piston 108 may be a separate component and is not necessarily integral with the plunger.

The embodiment of FIG. 12 utilises pressurised fluid to drive the plunger 12 down and optionally up. It will be appreciated that other drive mechanisms may be utilised. The plunger 12 may be driven by electromechanical solenoids. As solenoids only drive in one direction, a first set of solenoids is required to drive the plunger 12 downwards whilst another set is required to drive the plunger 12 upwards.

The plungers described are generally compact with a dimension in one direction being of a similar magnitude to a dimension in a transverse direction, i.e. the length and width are similar. These create waves that radiate outwards in a generally radial manner and which have similar size in all directions.

Figure 13:
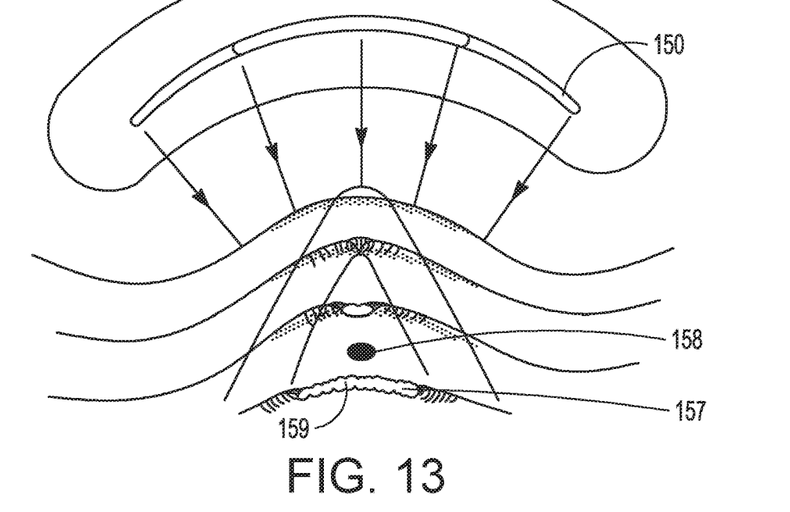
FIG. 13 shows a plan view of part of a pool with a wave generating system and reef array according to an implementation of the invention
Figure 14:
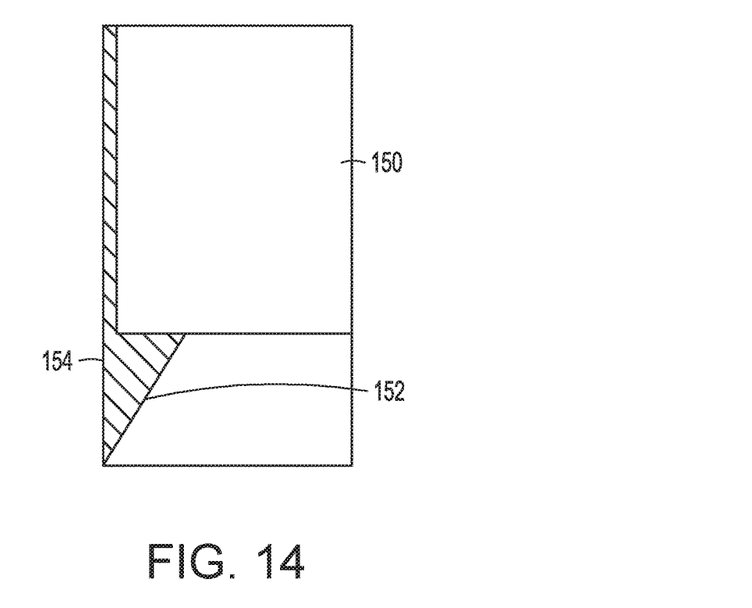
FIG. 14 shows a cross section view of the plunger of FIG. 13 taken though a vertical plane.

The invention is not limited to such plungers and wave shapes. FIGS. 13 and 14 show a plunger 150 that is relatively wide but relatively thin. In addition the plunger 150 is curved to provide a concave face (in plan view). As seen in FIG. 14 the concave face 152 is angled to the direction of (vertical) travel to generate a wave when pushed into the water. The convex rear face 154 is parallel to the direction of (vertical) travel and so when the plunger enters the water there is little or no wave generated by that face 154.

The concave surface 152 generates a wave that converges towards a point 158. One or two wave breaks may be generated by an artificial reef (not shown) the reef is preferably shaped so the wave has two opposed breaks 157 and 159 that move in opposite directions.

It will be appreciated that the asymmetrical nature of the plunger may be applied to the plungers shown in the previous figures, such that waves are only generated in specific directions.

Figure 15:
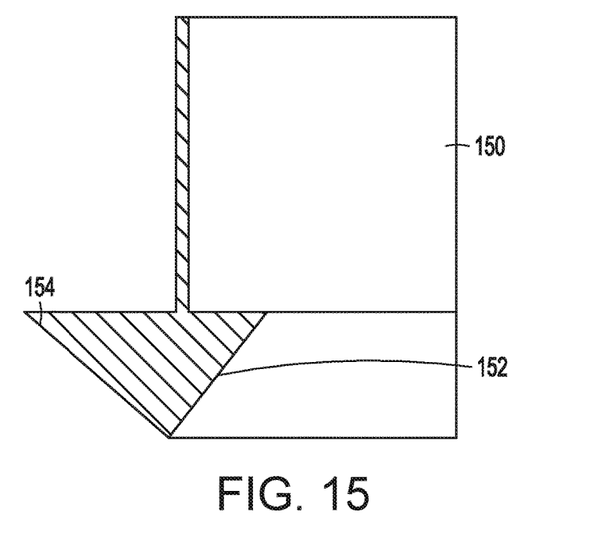
FIG. 15 shows a cross section view of an alternate to the plunger of FIG. 13 taken though a vertical plane.

If desired the convex face 154 of the plunger may be configured so as to generate waves, as shown in FIG. 15. It will be noted that the angle of faces 152 and 154 to the vertical need not be the same and, as in FIG. 15, may be different.

The ends of the plunger 150 may be shaped so as to generate waves from the ends and not just the concave and/or convex faces.

Figure 16:
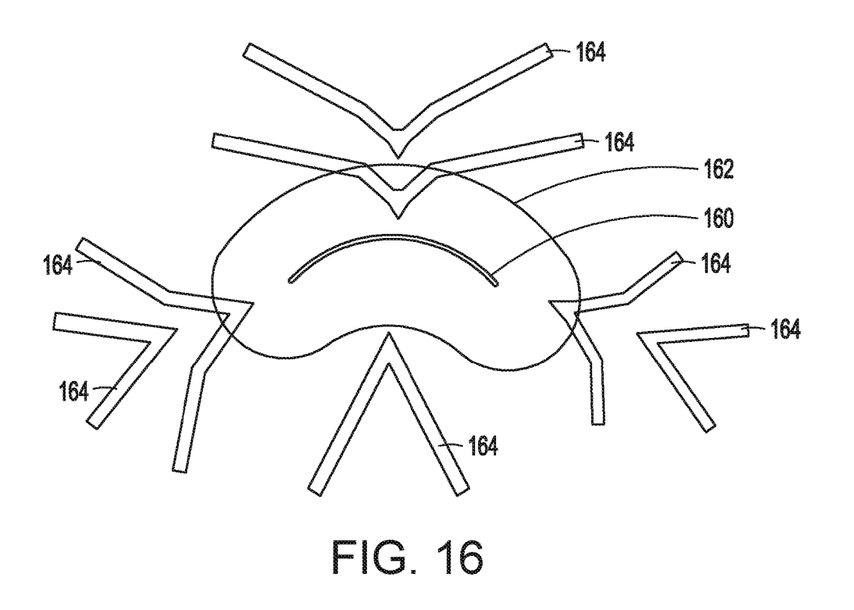
FIG. 16 is a schematic of the plan view of FIG. 13.

FIG. 16 shows a plunger 160 that generates a wave 162 in all directions located in a wave pool having a variety of artificial reefs 164 that generate wave breaks of various shapes and sizes.

Figure 17:
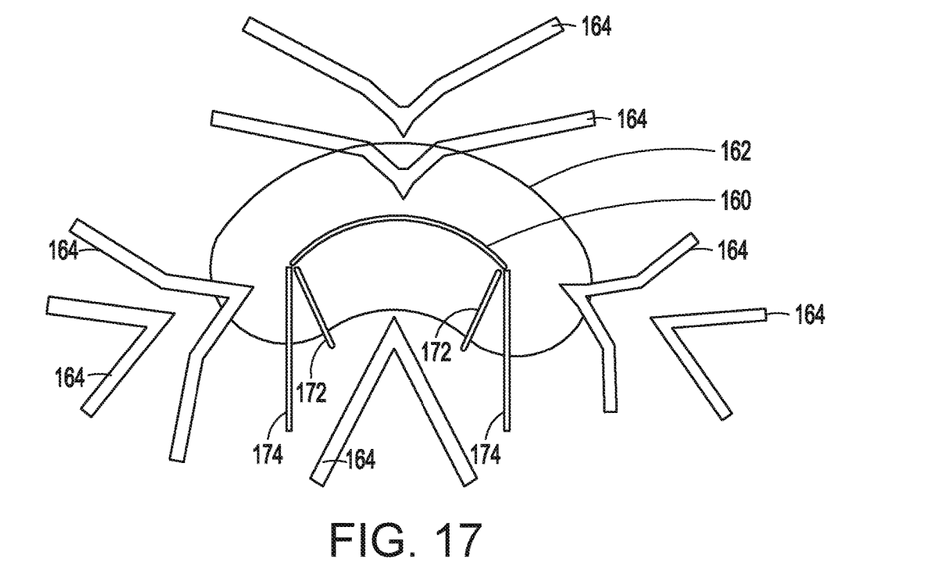
FIG. 17 is a schematic of the plan view of FIG. 13 with wave guides.

If desired, the wave pool may be provided with additional walls or guides to control waves. FIG. 17 shows a wave pool similar to that of FIG. 16 but in which there are guide walls. FIG. 17 shows two alternate variations. In one guide walls 172 extend from adjacent the ends of then plunger 160 and converge toward each other. This will further concentrate the waves and/or prevent sideways dissipation. In the second alternate variation walls 174 are parallel to each other and whilst they do not concentrate the waves they do prevent sideways dissipation.

Figure 18:
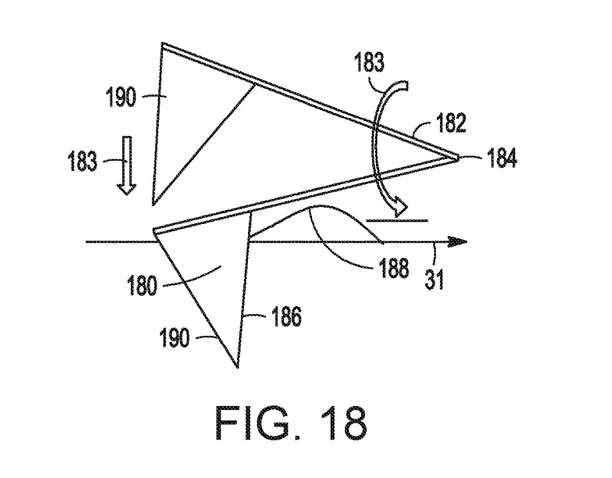
FIG. 18 shows a side view of part of a wave generating system.

FIG. 18 shows a plunger 180 that is mounted by arm 182 for rotation about axis 184. The plunger 180 has a face 186 that when driven into the water generates wave 188. Arrows 183 show the motion of the plunger 180. The face 190 may be shaped so that there is substantially no wave generated by face 190 or it may be shaped to produce a wave. The plunger 180 may be the same or similar to those shown in FIGS. 1 to 11 or the elongate plunger of FIGS. 13 to 15.

A series of plungers 180 may be arranged in one or more lines, so as to generate wider wave or a line like wave, compared to a single plunger. Where a series of plungers are utilised as a group they may be controlled so as to simultaneously enter the water. In one arrangement a line of plungers may be caused to sequentially enter the water.

Where a line of plungers is provided the line may be straight or curved. A curved line may be a circular arc, part of a parabola or any appropriate shape. Where a curved line is provided the plungers may generate a wave that converges on a central reef or similar.

Concentric waves need to be shaped in a particular way in order to create surfing waves.

By encapsulating a central wave generation method that radiates swells outwards within a closed area, the shoreline can be used to shape waves. However, in order to maximise the use of the facility and to separate surfers from swimmers, it is better to create a series of "offshore" reefs which can be part of the shaped floor, or as separately constructed and installed modular units.

It is desirable to cause a wave to separate into two breaks and in order for the breaking waves to peel in a direction; reefs must affect the waves at an angle to the swell. Because the concentric swells are radiating and growing in circumference, the reef must be changed in shape, angle and depth along the length of the break in order to create a consistent breaking wave.

Figure 19:
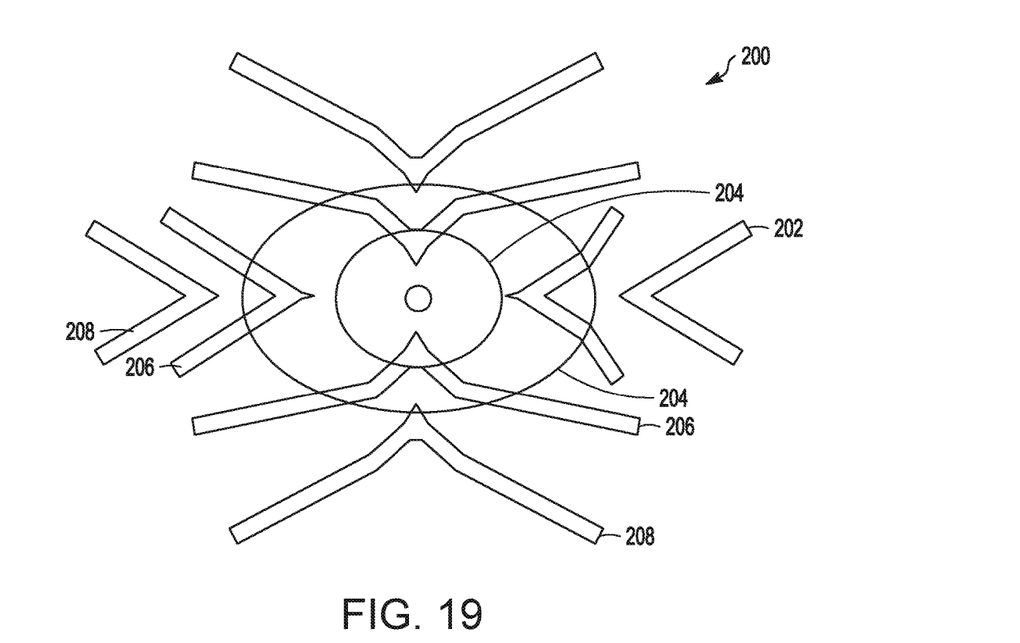
FIG. 19 is a schematic plan view of a reef array according to an implementation of the invention.

FIG. 19 shows an array 200 of modular reefs 202 arranged to provide for consistent breaking waves along the length of the swell, indicated by concentric lines 204. The array 200 may have a set of main (primary) reefs 206 to initially cause the swell to break. The array 200 may also have secondary reefs 208 that are set back from the main reefs 206, separated by deeper water, such that after breaking on the main reefs, the swell will reform, ready to break over the secondary reefs 208.

Figure 20:
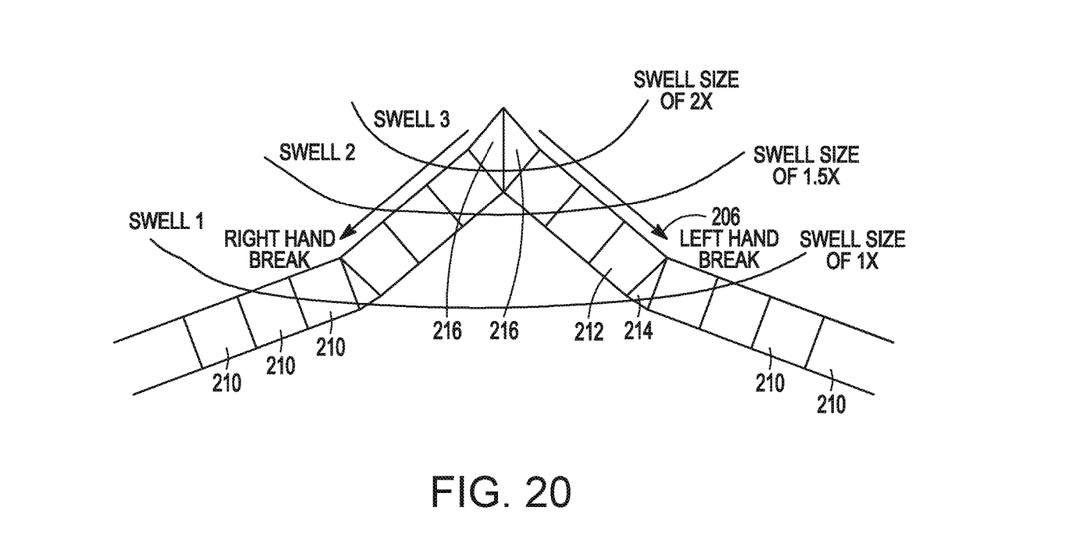
FIG. 20 is a detail of one of the reefs of FIG. 19.

FIG. 20 shows a detail view of one of the primary reefs 206 of FIG. 19. The reef 206 is formed of a series of individual modular reef units 210. The reef units 210 comprise generally rectangular units 212, angled units 214 and angled apex units 216. Rectangular units 212 may be laid in a relatively straight line with angle units 214 allowing a change of direction. Apex units 216 are provided to create the initial break in the swell.

A straight swell needs a reef to be generally the same depth along the reef length to provide a rideable break. However, a concentric swell is radiating outwards and reducing in intensity and so the reef needs to provide a reducing depth along the break to provide a consistent shape. Accordingly, the reef units further away from the wave source need to provide an upper surface nearer the water surface than those close to the wave source.

Figure 21:
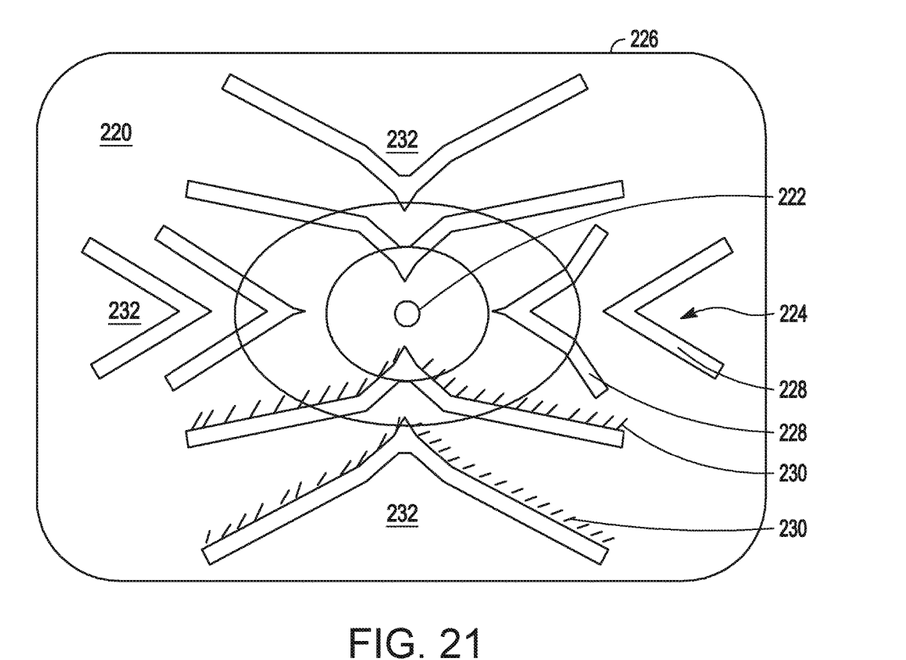
FIG. 21 is a schematic plan view of a reef array in an enclosed pool according to an implementation of the invention.
Figure 22:
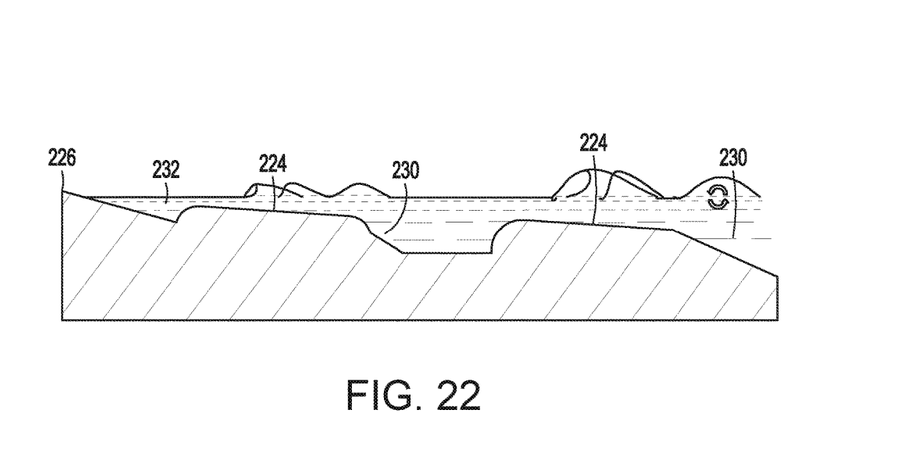
FIG. 22 is a side cross sectional view of the reef array of FIG. 21.

Using artificial reefs rather than the shoreline also allows separation of swimmers from surfers. FIGS. 21 and 22 shows a pool 220 having a wave source 222 and a reef array 224. The reef array may be similar to that of FIGS. 19 and 20. The reef array 224 is located away from the shoreline 226. Wave generated by wave source 222 breaks on the front surfaces/edges 228 of the reefs and surfers will ride these breaking waves in the shaded areas 230.

The areas 232 located between the outermost reefs and the shoreline 226 may be used by swimmers and the like.

The modular reef units may be fixed to the pool base or may be floating.

Figure 23:
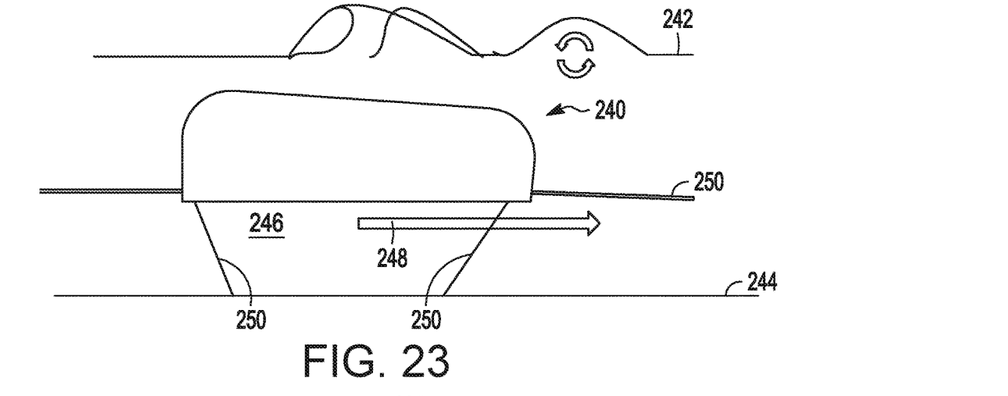
FIG. 23 is a side view of a first reef module for use in the reef array according to the invention.

FIG. 23 shows a floating reef unit 240 that is located beneath the water surface 242 and above the pool base 244. There is thus a passageway 246 between the reef unit 240 and the pool base 244 through which water that has broken on the shore line may return to the centre of the pool, as indicated by arrow 248. The reef units are buoyant and maintained in position by suitable anchor lines 250. These anchor lines preferably extend under the reef units to the base 244 so as not to be where users will surf.

Figure 24:
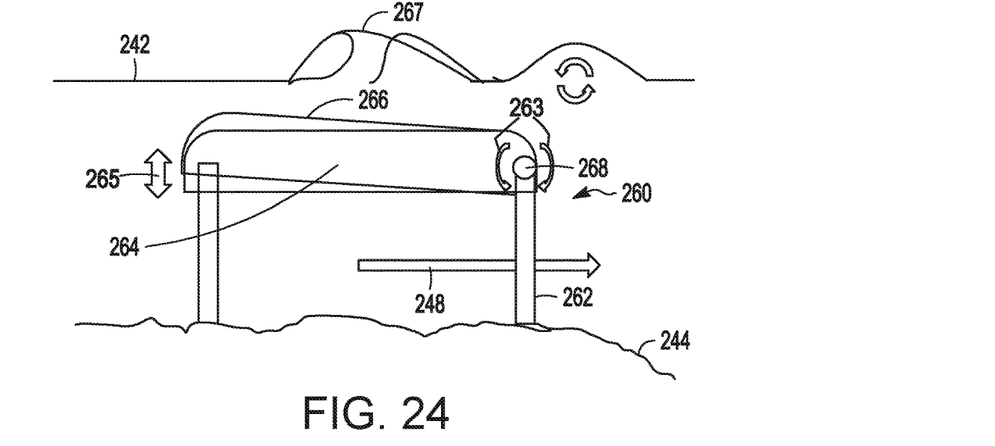
FIG. 24 is a side view of a second reef module for use in the reef array according to the invention.

FIG. 24 shows reef unit 260 anchored to the pool base 244. Unit 260 has legs 262 that support a member 264. The member 264 has a surface 266 used to generate wave breaks 267. The member 264 is preferably pivoted about front axis 268 as indicated by arrows 263 and 265 such that the surface 266 may be angled relative to the water surface 242. Preferably the legs are telescopic so the position of the surface 266 under the water surface 242 may be adjusted. By providing adjustable legs the axis 260 may be angled relative to the water surface, so as to provide a reef unit that rises toward the water surface with distance from the wave source. As with the FIG. 23 embodiment, passageway 246 exists under the unit 260 such that water may return toward the centre of the pool as indicated by arrow 248.

Figure 25:
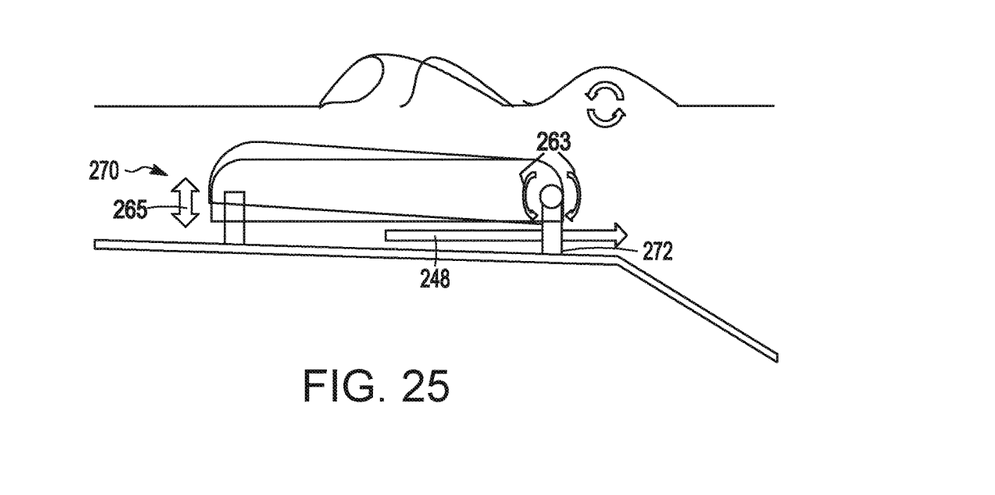
FIG. 25 is a side view of a third reef module for use in the reef array according to the invention.

FIG. 25 shows a reef unit 270 that is a variation of the unit 260. This is intended for shallow water applications and has shorter legs 272 but is otherwise functionally the same as unit 260.

Unless the context clearly requires otherwise, throughout the description and any claims the words "comprise", "comprising", and the like are to be construed in an inclusive sense as opposed to an exclusive or exhaustive sense; that is to say, in the sense of "including, but not limited to".

The features of the invention described or mentioned in this document may be combined in any combination of features where features are not mutually exclusive.

It will be apparent to those skilled in the art that many obvious modifications and variations may be made to the embodiments described herein without departing from the spirit or scope of the invention.

The claims defining the invention are as follows:

1. A wave generating system for use in a wave pool defining a body of water having a water surface and a shoreline, the wave generating system comprising:
  a plunger (22) having movable portions for adjusting a side cross section profile of the plunger by changing a shape of the plunger, wherein the movable portions are adjustable relative to one another to define a large profile of the plunger and a small profile of the plunger;
  a drive mechanism (100) for causing the plunger (22) to oscillate along a path intersecting with the water surface, wherein oscillation of the plunger (22) along the path generates waves in the wave pool; and
  a reef unit (260) located in the body of water between the plunger (22) and the shoreline, the reef unit (260) including a plurality of legs (262) and a member (264) supported by the plurality of legs (262), the member (264) having a wave break surface (266) under the water surface for generating wave breaks (267) as the waves propagate over the wave break surface (266), wherein the plurality of legs (262) are adjustable in length for adjustably positioning the wave break surface (266) at various depths under the water surface;
  wherein the wave generating system is controllable by adjusting the movable portions of the plunger relative to one another to adjust the side cross section profile of the plunger to generate waves having different amounts of energy; and wherein the wave generating system is controllable by adjusting the depth of the wave break surface under the water surface to cause the waves to break at a desired location in the wave pool.

2. The wave generating system according to claim 1, wherein the wave generating system is controllable by adjusting the movable portions of the plunger relative to one another to adjust the side cross section profile of the plunger to generate waves having different shapes.

3. The wave generating system according to claim 1, wherein an angle of the wave break surface (266) relative to the water surface is adjustable by adjusting the length of some of the plurality of legs (262).

4. The wave generating system according to claim 1, wherein the member (264) is supported by the plurality of legs (262) such that a passageway (246) is defined under the member (264) through which water may return from the shoreline toward the plunger (22).

5. The wave generating system according to claim 1, wherein the plurality of legs (262) are telescopically adjustable in length.

6. The wave generating system according to claim 1, wherein the side cross section profile of the plunger (22) is adjustable during oscillation of the plunger (22) along the path by adjusting the movable portions of the plunger relative to one another.

7. A wave generating system for use in a wave pool defining a body of water having a water surface and a shoreline, the wave generating system comprising:
  a plunger (22) having movable portions for adjusting a side cross section profile of the plunger;
  a drive mechanism (100) for causing the plunger (22) to oscillate along a path intersecting with the water surface, wherein oscillation of the plunger (22) along the path generates waves in the wave pool; and
  a reef unit (260) located in the body of water between the plunger (22) and the shoreline, the reef unit (260) including a plurality of legs (262) and a member (264) supported by the plurality of legs (262), the member (264) having a wave break surface (266) under the water surface for generating wave breaks (267) as the waves propagate over the wave break surface (266), wherein the plurality of legs (262) are adjustable in length for adjustably positioning the wave break surface (266) at various depths under the water surface;
wherein the wave generating system is controllable by adjusting the side cross section profile of the plunger to generate waves having different amounts of energy;
wherein the wave generating system is controllable by adjusting the depth of the wave break surface under the water surface to cause the waves to break at a desired location in the wave pool;
wherein the side cross section profile of the plunger (22) is adjustable during oscillation of the plunger (22) along the path; and
wherein the side cross section profile of the plunger (22) is adjustable to a relatively larger side cross section profile for immersing the plunger (22) into the body of water and is adjustable to a relatively smaller side cross section profile for raising the plunger (22) relative to the body of water.

\* \* \* \* \*